June 26, 1945.   V. H. HARBERT   2,379,296
PIN AND LOCK
Filed Nov. 20, 1944
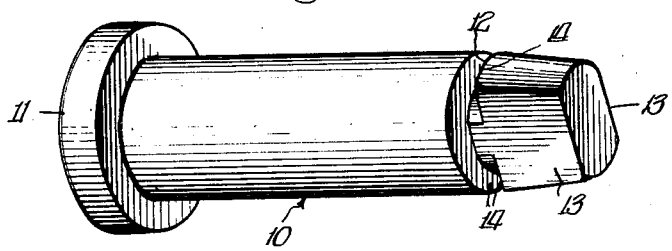
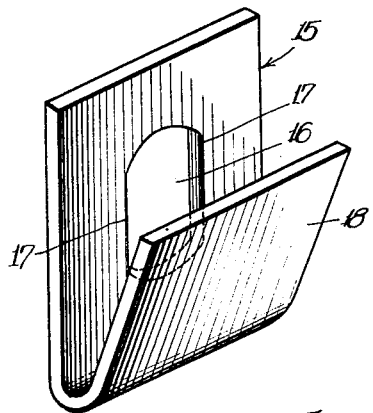
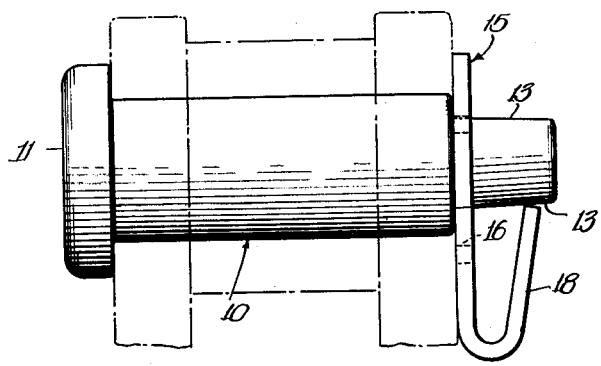
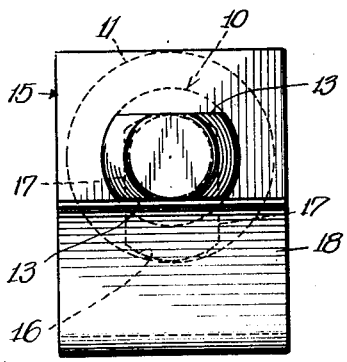
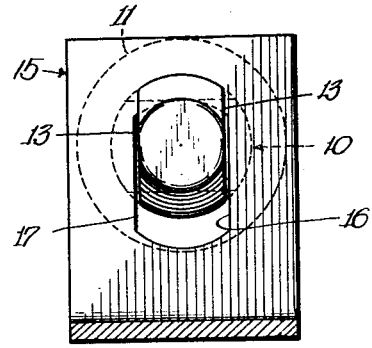
INVENTOR.
Victor H. Harbert,
BY
ATTY.

Patented June 26, 1945

2,379,296

UNITED STATES PATENT OFFICE 2,379,296

PIN AND LOCK

Victor H. Harbert, Chicago, Ill., assignor to Illinois Railway Equipment Company, Chicago, Ill., a corporation of Illinois Application November 20, 1944, Serial No. 564,395

5 Claims. (Cl. 85—5)

My invention relates to a pin, whereby certain elements are retained in place, as for example brake pins in use on railroad cars, with the pin constructed to receive a specially designed element whereby the pin, after insertion, is locked in place against accidental removal.

My improved means is designed to eliminate the difficulties at present encountered, especially in connection with railroad car brake pins, due to the ineffective methods employed for locking the pins in place. These pins as heretofore employed are provided with a head at one end with the other or tail end of the pin provided with a hole disposed transversely therethrough to receive a small pin or cotter whose ends are spread, after insertion, to retain the cotter in place.

As a result of the constant vibration to which brake pins are subjected a constant shearing off of the small pins or cotters has been encountered, permitting the brake pins to work loose with frequent serious results. Then too, as a result of corrosion, the small pins or cotters were broken and lost. The difficulties mentioned have also resulted from carelessness on the part of workmen failing to properly spread the ends of the cotter, thus allowing it to readily work out of its hole in the end of the main pin.

In order to overcome these serious difficulties, I have devised a pin adapted to receive my improved locking element made to effect a positive locking relation with the pin and at the same time provide a wide or washer-like bearing surface at the end of the pin whereby any wear will be distributed over a greater area than could be afforded by a small pin or substantially round cotter; a structure which will have no rotative or other movement relative to the pin and hence will cause no wear of the pin, as, however, is the case with means as at present employed.

The objects and advantages of my invention will all be readily apparent from the following detailed description of the exemplification of the invention as disclosed in the accompanying drawing, wherein—

Figure 1 is a perspective view of my improved pin.

Figure 2 is a perspective view of my improved pin locking means.

Figure 3 is an elevation of the tail end of the pin and of the locking means, with the tongue of the latter broken away, showing the relative positions of the pin and locking means during initial application of the latter to the pin.

Figure 4 is a similar view showing the pin rotated ninety degrees from its position in Figure 3 and the tongue of the locking means bent into locking position.

Figure 5 is a side elevation of the pin with the locking means applied and in locking position.

In the particular exemplification of the invention, the pin 10, in general construction, is of the usual cylindrical type provided with the usual head 11 at one end, while the other or tail end at a predetermined distance removed from the immediate or distal end is provided with an annular groove of predetermined depth as at 12, and the end of the pin 10, beyond said groove 12, at two of the diametrically opposite sides, is segmentally cut away to provide the two, substantially, flat surfaces as indicated at 13, 13 in Figures 1 and 5; while the other two diametrically opposite arcuate sides are of the original pin diameter, thus presenting a pin section of somewhat oblong cross-section (as shown in Figure 1) with two substantially straight sides and two arcuate sides which latter provide shoulders 14, 14 at opposite sides of the pin.

The lock member, as exemplified in the drawing, consists of a rectangular plate 15 provided with an opening 16, shown with two substantially straight side walls 17, 17 matching the substantially straight or flat sides 13, 13 of the pin 10.

This enables the plate 15 to receive or be placed on the end of the pin when the side walls 17, 17 of the opening 16 are arranged parallel with the flat sides 13, 13 of the pin, allowing the plate to register with and to rotate in the groove 12 of the pin.

As is apparent, by partially rotating the plate 15 or giving it a quarter turn, the straight sides 17, 17 of the opening 16 will be out of register with the flat or straight sides 13, 13 of the pin and will be aligned with the arcuate sides of the pin, where the major axis of the tail end of the pin is greater than the distance between the straight sides 17, 17 of the opening 16 in the lock member 15, and these straight sides therefore will effect interlocking engagement with the shoulders 14, 14 of the pin and prevent removal of the lock member 15 while in the rotated position mentioned.

In order to hold member 15 in its rotated position and to maintain the locked relation between member 15 and the pin 10, the lock member 15, made of relatively soft or bendable material, preferably steel, is made of sufficient length beyond one end of the opening 16 to permit the imperforate or extended portion to be bent backward in the general direction of the opening to provide a pin engaging portion or tongue 18 which terminates slightly above the plane of the lower or adjacent end of the pin receiving opening 16. The tongue 18 initially is bent as shown in Figure 2 so as to provide sufficient clearance for the tail end of the pin 10 during assembly.

As is apparent from the drawing, in order to apply the lock member 15 to the pin, the plate or member 15 must be positioned with the straight sides 17 of the opening 16 parallel with the reduced or straight sides 13, 13 of the pin, as the distance between the arcuate ends of the opening 16 preferably is just sufficient to receive the non-reduced or major diameter of the end of the pin. The pin or the lock member or plate 15 is then partially rotated on the pin, namely a quarter of a turn, thereby presenting one of the reduced sides 13 of the pin toward the upturned tongue 18, while at the same time permitting the tongue to clear the end of the pin.

It will, of course, be understood that the pin is first inserted into its operative position, as for example shown in dotted lines in Figure 5, before the lock member is applied. After the pin has been positioned and lock member 15 has been applied thereto, as previously described, the tongue 18, by means of a hammer-blow or otherwise is then forced or bent toward the main body of the lock member until the free straight end of the tongue 18 is in bearing contact with the adjacent cut-away or flat side of the pin, thereby locking the pin and member against relative rotation and locking the pin against removal from its operative position, with the straight sides 17, 17 of the lock-plate opening 16 held by the shoulders 14, formed by the groove or in the arcuate sides of the pin which will prevent movement of the plate longitudinally of the pin in either direction.

The lock plate provides a wide washer like bearing surface for the end of the pin which will distribute the wear over a greater area than is afforded by the usual round pin or cottor, heretofore employed on brake pins.

As heretofore constructed, the tail end of the pin was provided with a transverse hole extending therethrough to receive a cotter pin for holding the main or brake pin in place.

In practice, especially where the main or holding pin was employed as a brake pin, the transverse hold through the pin, due to the constant vibration to which it was subjected, induced vibration and rotative movement of the cotter which in turn caused wear of the hole in the main pin and at the same time reduced the diameter of the cotter, with the result that the latter soon sheared off.

With my improved device, relative rotative movement between pin and lock member, as well as vibration of the latter, are impossible and as is apparent, the more flange or tongue 18 of the lock plate 15 is depressed, the greater or firmer will be its pin locking effect.

My improved lock device not only is easily applied but it also may be readily removed by simply prying the flange or tongue 18 outwardly out of bearing contact with the flat side 13 of the pin 10.

The construction illustrated is believed to be the best embodiment of the invention, but certain modifications are possible without, however, departing from the spirit of the invention as defined in the appended claims.

What I claim is:

1. A device of the character described comprising a pin provided with an annular groove at a distance removed from the pin-end and the portion of the pin intermediate the groove and the pin-end segmentally cut away on two opposite sides, in combination with a lock plate provided with an oblong opening matching the cross-sectional configuration of the pin-end, the plate being seatable and rotatable in said groove, the plate having a bendable tongue portion adapted to be bent into abutting relation with a cut-away side of the pin and thereby lock the plate against rotation in the pin-groove.

2. A device of the character described comprising the combination of a pin provided with a groove at a distance removed from the pin-end and the pin portion intermediate the groove and the pin-end being diametrically reduced transversely in one direction; and a lock plate provided with an opening matching the cross-sectional configuration of the pin-end to permit the latter to pass therethrough, said plate being seatable and rotatable in said groove, the plate being provided with a bendable tongue adapted to engage the reduced side of the pin and thereby lock the plate in its rotated position on the pin.

3. A device of the character described comprising the combination of a cylindrical pin provided with an annular groove at a distance removed from the pin-end, the pin intermediate the groove and its adjacent end at least on one of its sides being segmentally cut away to provide a non-circular face; and a lock plate provided with an opening matching the cross sectional configuration of the pin-end to permit the latter to pass therethrough, said plate being seatable and rotatable in said groove, the plate being provided with a bendable tongue adapted to engage the non-circular face of the pin and thereby lock the plate in its rotated position in the groove against rotation.

4. A device of the character described comprising the combination of a pin provided with parallelly arranged shoulders at a distance removed from its end and the portion of the pin intermediate the shoulders and the end being diametrically reduced in one direction to provide a substantially flat side; and a lock plate provided with an opening formed to match the cross sectional configuration of the pin-end to permit the latter to pass therethrough so as to bring the walls of the opening into abutting relation with said shoulders and permit rotation of the plate about the pin, said plate having a bendable tongue disposed toward said opening and adapted to be bent into engagement with the flat side of the pin and thereby lock the plate in its rotated position against said shoulders.

5. A device of the character described comprising the combination of a cylindrical pin provided with a head at one end and an annular groove at a distance removed from the other end, the portion of the pin intermediate the groove and the adjacent end being segmentally cut away at two opposite sides to provide substantially flat surfaces; and a flat lock plate provided intermediate its side edges with an elongated opening having arcuate ends and straight sides to match the cross sectional configuration of the pin-end to enable the latter to pass therethrough and permit the plate to enter said groove and to rotate about the pin, one end of the plate being bent in the direction of said opening to provide a bendable tongue adapted to engage one of the flat surfaces on the pin and thereby hold the plate in its rotated position in the pin groove and lock the plate on the pin.

VICTOR H. HARBERT.